UNITED STATES PATENT OFFICE.

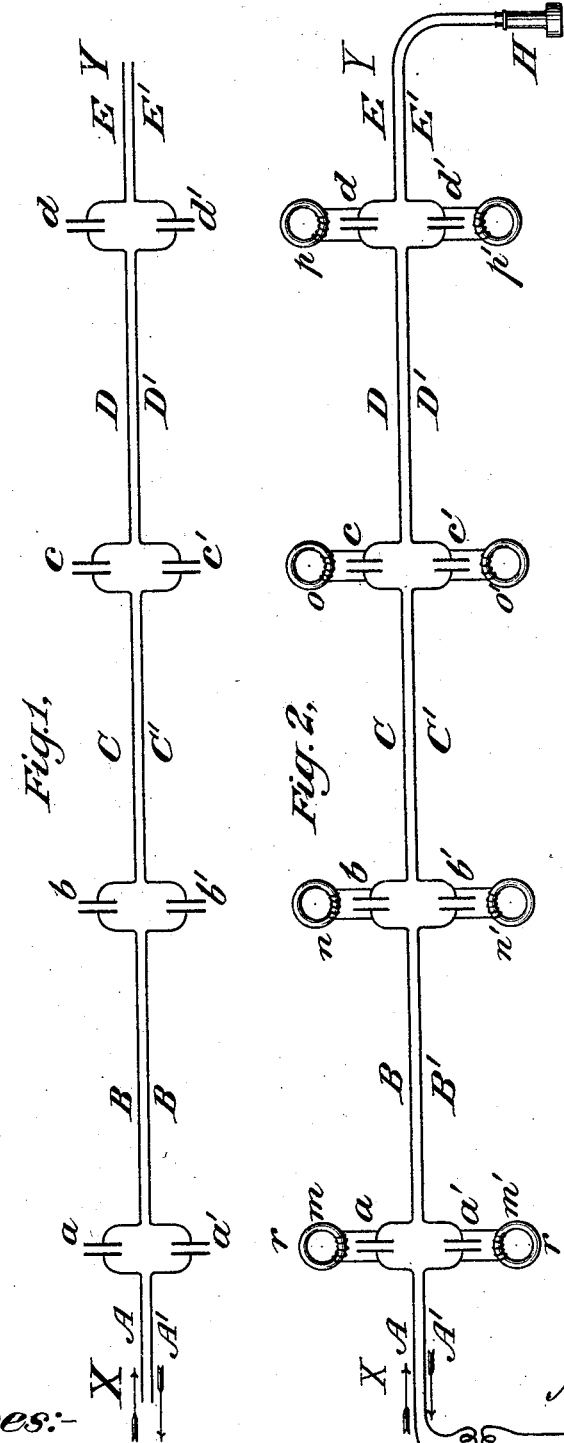

MICHAEL IDVORSKY PUPIN, OF NEW YORK, N. Y.

APPARATUS FOR TELEGRAPHIC OR TELEPHONIC TRANSMISSION.

SPECIFICATION forming part of Letters Patent No. 519,346, dated May 8, 1894.

Application filed December 14, 1893. Serial No. 493,651. (No model.)

*To all whom it may concern:*

Be it known that I, MICHAEL IDVORSKY PUPIN, of the city, county, and State of New York, have invented a new and useful Method of and Apparatus for Electrical Transmission, of which the following is a specification.

The invention is one by means of which I can, on the one hand, overcome the impedence which electrical cables possessing considerable self-induction, electrostatic capacity, and electrostatic absorption offer to varying, and especially to rapidly varying, electrical currents, and on the other hand vary the time constant of the circuit.

By "impedence" as everywhere herein employed, I do not mean electro magnetic impedence, but the combined reaction of the ohmic resistance, self induction, electrostatic absorption and the attenuating effect of distributed capacity of a long cable.

By "time constant" I mean the number of seconds during which an electro-motive force practically completes its process of charging the circuit.

The transmission of rapidly alternating, intermittent, or any other kind of variable currents over long cables, especially submarine cables, is a problem which has not yet received a satisfactory solution. The consequence is that on the one hand the present limit of the rapidity with which telegraphic messages can be sent over such cables especially over submarine cables, is very low, and, on the other hand, it appears to most electrical scientists of the present day that the transmission of telephone currents over submarine cables of considerable length, say over fifty miles, is practically impossible. It is well understood that the difficulty of transmission of alternating, intermittent, or any other kind of variable currents over such cables is owing to the physical fact that the combined action of the self induction, the electrostatic capacity, and the electrostatic absorption of the insulation, of such cables when constructed according to methods which now prevail offer an insurmountable barrier to these currents. My theoretical and experimental investigations, some of the results of which were published in various scientific periodicals (*American Journal of Science*, April, May and June, 1893, proceedings of the American Institute of Electrical Engineers, May, 1893, and others), lead me to the conclusion that alternating, intermittent, or varying currents of any kind, even when their rate of variation or frequency is high, can be easily transmitted over land or submarine cables of even very considerable length, as for instance the length of a transatlantic cable.

I will first state the physical facts and principle upon which my invention is based:

*First physical fact.*—Every electrical circuit behaves, in consequence of its self-induction and capacity toward a periodically varying electro-motive force, just as a heavy elastic body, in consequence of its inertia and elasticity, behaves toward a periodically varying disturbance. For just as such a body has a definite period of vibration, so an electrical circuit has a definite period of its own, that is to say, when its electrical equilibrium is disturbed by an external impulse a periodic electrical current will result. This period depends not only as heretofore supposed on the self-induction, the electrostatic capacity and the ohmic resistance, but also as I have discovered on other frictional resistances of the circuit, such as magnetic and dielectric hysteresis for instance. The ohmic and other frictional resistances can, however, generally be reduced in such a way that they would practically have no influence on the period of the circuit. This may be done by avoiding closed magnetic circuits, by reducing the amount of iron to a minimum and by laminating and annealing iron. In such cases the period depends on the self induction and the electrostatic capacity of the circuit alone so that by a suitable change of these two the periodicity of the circuit can be changed in any way that may be desirable. The process of changing the period of a circuit by a suitable change in either its co-efficient of self-induction, or in its electrostatic capacity, or in both, I shall denote herein by the expression "tuning the circuit."

*Second physical fact.*—The electro magnetic impedence which such an electrical circuit as above described in which the other frictional and magnetic resistances have been reduced offers to an impressed simple harmonic electro-motive force diminishes gradually with the approach of the periodicity or pitch of this electro-motive force to the periodicity or pitch of the circuit. It is a minimum, and equals the ohmic resistance of the circuit when the two periodicities are the same; that is, when the impressed electromotive force and the circuit are in resonance. I have found that if a complex harmonic electro-motive force acts upon such a circuit and if the periodicity of the circuit is considerably above the highest periodicity of the harmonics contained in the complex electromotive force, then the electro-magnetic impedence which the circuit will offer to the various component harmonics of the electromotive force will be very nearly inversely proportional to the periodicity of these components.

I believe that I have been the first to call attention to the portions of these two physical facts which have been especially emphasized above, and more especially that I have been the first to discover that the influence of magnetic and dielectric sluggishness varies with the period of the impressed electro-motive forces and more especially with high periods. I certainly consider myself the first to have practically applied these principles for the purpose of electrical transmission. I have also found that these two physical facts and the principle underlying them can be extended in such a way as to include circuits divided into sections by interposed condensers which connect in series the several sections of the circuit, that is to say I have found that all the rules of tuning a circuit can be applied to such a circuit as to the whole or to any part of it. This extension is my own discovery and it is disclosed now in this specification for the first time. It enables me to regulate the time constant and the electromagnetic impedence of a long conductor and at the same time also to diminish the attenuating effect due to distributed electrostatic capacity and also diminish the electrical absorption in the insulation of such conductor. I now proceed to set forth the principle of this method:

If the parts into which the circuit is divided act upon each other by electrostatic induction, then the period of the total circuit is equal to the period of any one of its parts, if said parts are equal and essentially similar. Hence, according to the first physical fact and the extension of this fact mentioned above, if the ohmic and other frictional resistances in such a circuit due to dielectric and magnetic hysteresis are reduced in each part in such a way that the period of any part depends practically on the self induction and the electrostatic capacity of that part, then the period of the whole circuit, no matter what its length may be, will depend on the self-induction and the electrostatic capacity of any one of the parts, and on nothing else; but if said parts are not equal nor similar to each other, then the circuit may be said to contain as many periods as it has parts. I call these the partial periods of the circuit. There will, however, be one period for which the electromagnetic impedence of the circuit is a minimum. This period I call the period of the circuit; it lies between the shortest and the longest partial periods. Then the conditions of resistances above mentioned, being fulfilled, both the partial periods and the resultant period will depend on the coefficient of self-induction and the electrostatic capacity of the various parts, and on nothing else. This relation of the partial periods to the total period of a sectional conductor just described will hold true even if these partial periods are not independent of the ohmic and other frictional resistances, provided that these frictional resistances are not beyond the limits outside of which they render the several parts of the conductor aperiodic.

In carrying my method into practical effect, I prefer to proceed as follows, and by the aid of the following means:

Let a long electrical cable be divided into any number of parts, and let condensers be interposed between these parts, so that the various parts of the cable connect the various condensers in series. To illustrate this, consider a cable six thousand miles long having a total electrostatic capacity of five hundred microfarads. Dividing it into six thousand equal parts, making thus each part one mile long, we shall have an electrostatic capacity of one-twelfth microfarad per mile. Interposing six thousand condensers of twenty microfarads each, I shall have for the total effective electrostatic capacity of the cable $\frac{20+1\cdot12}{6000}=\frac{1}{300}+\frac{1}{72000}$ microfarads. That is, I shall have reduced the effective electrostatic capacity of the cable to nearly one one-hundred and fifty thousandths part of its original value before division, and I shall also have the line capacity of the cable very small in comparison to the electrostatic capacity of the interposed condensers. Therefore, I may construct the cable so that the statical charge of the line at any moment during the variable flow of an electrical current along the cable, can be made small in comparison to the static charge in the interposed condensers; hence the electrostatic absorption of the whole cable can be made practically independent of the dielectric properties of the insulation of the cable, and be confined entirely to the dielectric properties of the insulator employed in the interposed condensers. Hence, if condensers, possessing no electrostatic absorption are used, as for instance, carefully constructed mica condensers, then the electrostatic absorption of the total cable can be reduced to any practical limit that may be desired.

The foregoing, which is based upon careful investigations and experiments made by myself, is of extreme practical importance in view of the present well-known difficulties arising from electrostatic absorption by the insulation of cables as now constructed.

I also prefer in practice to place in shunt with each condenser a coil of wire of many turns surrounding an iron core, which core forms a closed, or nearly closed, magnetic circuit. When such a coil is shunted by a condenser and placed into a circuit in which a periodically varying electro-motive force acts, then as long as the frequency of the electro-motive force is over about fifty periods per second, the effect of the condenser capacity upon the current through the coil will be inappreciably small. This is a novel fact and apparently contradictory to all experiences in telegraphy; but the contradiction is only apparent.

Referring now to the accompanying drawings, Figure 1 is an electrical diagram symbolically representing a conductor divided into parts and having interposed condensers, constructed and arranged in accordance with the foregoing. Fig. 2 represents the same with shunt coils added.

Similar letters of reference indicate like parts.

Suppose it is required to construct a cable to connect two places three thousand miles distant from each other, the cable to have six thousand ohms resistance and a periodicity of eighteen hundred periods per second.

Fig. 1 indicates a preferable construction of a part, X Y, of such a cable, according to my method. The cable is divided into equal sections, A, B, C, D, E, and the return sections, A', B', C', D', E'. A A', B B', &c., act upon each other through electrostatic induction by means of the condensers $a\ a'$, $b\ b'$, $c\ c'$, $d\ d'$, &c., or in other words, the condensers are connected in series to each other by means of the sections of the cable. Let the capacity of each condenser be twenty microfarads, and let there be three thousand pairs of condensers so that two successive pairs are at the distance of one mile from each other. The sections A A', B B', &c., will therefore be each one mile long. To simplify the description, I shall assume that each of these sections consists of a thick cylindrical copper wire 0.5 centimeters in diameter. It is evident, however, that wire ropes or flat strips of a conductor can be used as well. Well annealed copper being used I shall have for each mile about one ohm resistance (see Stewart and Gee, *Practical Physics*, Vol. II, p. 116), hence for six thousand miles six thousand ohms. Let the adjacent cylindrical conductors be parallel to each other, and let the distance between their axes be 2.72 multiplied by their radius. According to Maxwell (*Electr. and Mag.* Vol. II, p. 294) I shall have for the self-induction of the conductor connecting two successive condensers, denoting it by L: L=.000396 Henrys. Since each conductor is connected to a capacity of twenty microfarads, we shall have for the period of each part of the cable:

$$T = \frac{2\pi}{10^3}\sqrt{LC} = \tfrac{1}{1800}\text{ (about)}$$

where T is the period of any one of the equal parts of the cable, measured in seconds, L, is self-induction, measured in Henrys, and C, its capacity, measured in microfarads. The resistance has a very small effect upon the period, as a simple calculation will show. The electro-magnetic impedence of this cable to a simple harmonic current of eighteen hundred periods would be six thousand ohms, that is to say, a simple harmonic electro-motive force whose period is one eighteen hundredths of a second and whose mean amplitude is say one thousand volts, would send through such a cable a current whose mean value will be one-sixth ampère reversing three thousand six hundred times per second. This is true of course on the supposition that the alternating effect of the distributed capacity of the cable be neglected. This form of cable I call a "high pitch cable," because it has a high periodicity, much higher than the periodicity of the notes in the average human speaking voice. It is evident that a periodicity of two hundred complete periods per second would more than suffice for telegraphic purposes in which case it would be necessary to have only sixty pairs of twenty microfarad condensers, which would, of course, reduce the cost of the cable very much. The high pitch cable, however, which I am describing would be a form of cable suitable to the transmission of telephone currents, through cables possessing large distributed capacity, as for instance, a trans-Atlantic cable, for reasons which can now be stated briefly.

The range of notes in the average human speaking voice is about between one hundred and twenty and six hundred complete periods per second. To show the advantage of this form of cable it is well to calculate the electro-magnetic impedence for periodicities lying between the two limits just mentioned. Let $i_{120}$ stand for electro-magnetic impedence to an electro-motive force of periodicity 120, and let $i_{600}$ stand for the electromagnetic impedence to an electro-motive force of periodicity 600, then:

$$\left.\begin{array}{l}i_{120} = 400000 \text{ ohms}\\ i_{600} = 80000 \text{ ohms}\end{array}\right\} \text{very nearly.}$$

The lower periodicities would therefore be rendered somewhat weaker; the rendering would be very nearly inversely proportional to the number of periods per second. To illustrate this result, I now assume that two suitable telephones, G H, one at the station X and one at the station Y, three thousand miles distant from X, form a part of this circuit, and that a note is sung into the telephone at X. Supposing that the note is composed of a fundamental note having one hundred and twenty periods per second and of four upper harmonics having two hundred and forty, three hundred and sixty, four hundred and eighty and six hundred periods per second. It is well known that the vibrating telephone diaphragm at X will induce in the circuit a complex electro-motive force consisting of the fundamental simple harmonic electro-motive force having one hundred and twenty periods per second and also of the upper harmonics having the periodicities of two hundred and forty, three hundred and sixty, four hundred and eighty, and six hundred periods per second. A perfect telephone diaphragm would produce these harmonic electro-motive forces in such a way, that their amplitudes would be in the same ratio to each other as the amplitudes of the sound harmonics in the note which is uttered into the telephone. If, however, the diaphragm of the telephones G and H are of low pitch, then the induced electro-motive force would be stronger in its lower harmonics than the sound waves which set the diaphragm into vibration. It is evident, therefore, that the tendency of the telephone diaphragm to strengthen the lower harmonics of the sound can be counterbalanced as nearly as desirable by the tendency of the cable to strengthen the upper harmonics; so that a long distance transmission of telephonic currents by a cable of the description just given is not necessarily accompanied by a distortion of the sounds transmitted.

I assume now that the mean value of the induced simple harmonic component electro-motive forces with a perfect telephone diaphragm would be: one volt for the fundamental harmonic; one-half volt for the first upper harmonic; one-third volt for the second upper harmonic; one-fourth volt for the third upper harmonic, and one-fifth volt for the fourth upper harmonic. This ratio of the amplitudes represents the ratio of the mean values of the amplitudes of the harmonics in the sound vibrations which agitate the telephone diaphragm. The mean values of the component simple harmonic currents would be one four-hundred thousandths ampères for every harmonic. Hence the color of the sound would be somewhat changed. But it can be easily seen that with a telephone diaphragm favoring lower notes the above ratios of the induced electro-motive forces could be changed so as to give say: one volt for the fundamental harmonic; one-fourth volt for the first upper harmonic; one-ninth volt for the second upper harmonic; one-tenth volt for the third upper harmonic, and one twenty-fifth volt for the fourth upper harmonic. In this case the mean values of the component harmonic currents would be:

$1 \times \dfrac{1}{4 \times 10^5}$ ampères for the fundamental harmonic.

$\dfrac{1}{2} \times \dfrac{1}{4 \times 10^5}$ ampères for the first upper harmonic.

$\dfrac{1}{3} \times \dfrac{1}{4 \times 10^5}$ ampères for the second upper harmonic.

$\dfrac{1}{4} \times \dfrac{1}{4 \times 10^5}$ ampères for the third upper harmonic.

$\dfrac{1}{5} \times \dfrac{1}{4 \times 10^5}$ ampères for the fourth upper harmonic.

That is to say, the intensities of the component simple harmonic currents would be to each other in the same ratio as the intensities of the simple harmonic sounds of which the sound uttered into the telephone is composed. Hence there would be no discoloration in the transmitted sound. It should be observed here that every one of the above currents is very much stronger than the currents which can produce audible sounds in the telephone, for, according to trustworthy investigations, currents of the order of magnitude of $\dfrac{1}{10^9}$ ampères produce sounds in the telephone that can be heard very easily. But these numerical values of the currents just obtained will be modified if the hypothesis on which the calculations so far have been made is dropped, the hypothesis, being, namely, that the electrostatic capacity of the conductor of any one section of the cable is infinitely small in comparison to the capacity of the terminal condensers of that section. A brief discussion of that modification will bring out clearly another very great improvement which I can obtain by constructing a cable embodying my present invention.

Consider the instantaneous electrical state of the cable at any moment when an alternating current is flowing through it. Commence at the first pair of condensers nearest to the transmitter. One condenser will be on the positive side of the transmitter at that moment and the other on the negative side. I shall confine now my attention to the series of condensers which are at the moment considered on the positive side of the transmitter. This series consists of three thousand condensers distributed equidistantly between the two stations. One side of the first condenser of the series will have, at the particular moment under consideration, a charge $m$. This charge induces a charge $-m_1$ on the opposite side of the condenser. In the second condenser I have charges $m_1$ and $-m_2$, and so forth until I reach the last condenser. In this one I have charges $m_{n-1}$ and $-m_n$. An exactly similar distribution of charges will take place in the series of condensers on the negative side of the transmitter. In my case $n = 3000$. The charges $m$ and $m_1$, $m_1$ and $m_2$, &c., are not numerically equal to each other because the capacities of the conductors connecting the various condensers are not infinitely small in comparison to the capacities of the condensers. Let the capacity of half the conductor connecting two consecutive condensers be the $l^{\text{th}}$ part of the cacacity of one of the condensers—then I shall have $$m_1 = \frac{m}{1+l}$$
$$m_2 = \frac{m_1}{1+l} = \frac{m}{(1+l)2} \quad \&c.$$
$$m_n = \frac{m}{(1+l)_n}$$

In the cable described above we have $$n = 3000 \qquad l = \tfrac{1}{480}$$

Hence $$m_n = \frac{m}{\left(1 + \frac{1}{480}\right)^{3000}} = \frac{m}{500} \text{ (very nearly)}.$$

The currents in the various sections of the cable would vary in very nearly the same ratio, that is to say, the value of the current at the receiving station would be only the one five-hundredth part of the theoretical value, deduced on the supposition that the line capacity of the conductors of the various sections is infinitely small in comparison to the capacity of the condensers. To show now the numerical value of these currents at the receiving station, I shall point out the value of the weakest one among them. It will be $$\tfrac{1}{5} \times \frac{1}{4 \times 10^5 \times 500} = \frac{1}{10^9} \text{ampères}.$$

As observed before, this current is, according to very trustworthy investigations, over a thousand times stronger than the weakest current that can be heard in a telephone. It should be also remarked that the telephonic current which could be sent over the cable just described would be much greater, because the impressed electromotive force generated by the induction coil of a good transmitter is much greater than the voltage with which I started in the above calculation.

To state, in a concise form, this very important improvement in cables constructed according to my invention I introduce now the following definition:—Consider the current in the conductor of any section of the cable. That current consists of two distinct parts. One part is due to the charging of the terminal condensers of that section, and the other is due to the charging of the surface of the conductor itself. The first current I call the longitudinal displacement component, and the second current I call the lateral displacement component of the current in that section. The above mentioned very important improvement consists, therefore, in diminishing the ratio between the lateral and the longitudinal displacement components of a rapidly varying current. The wasting of a current due to the lateral displacement components in the various parts of a cable acts evidently like an impedance, therefore it is to be understood that the word "impedance" herein includes the impedance due not only to ohmic resistance, self-induction, &c., but also the impedence resulting from the lateral displacement currents.

Referring now more particularly to Fig. 2, for the purpose of giving the divided cable an uninterrupted metallic circuit so that in case of a break the fault may be located by ordinary methods, there is connected with each condenser in shunt a coil, as $mm'$, $nn'$, of many turns, surrounding a closed or substantially closed magnetic circuit, such as an iron ring, $r$. These coils, in consequence of their large self-induction and also in consequence of the electro-magnetic property which I have before mentioned, and will now describe more fully, will not allow an appreciable part of the main current to pass from one section of the cable to the next as long as the frequency of that main current is anywhere above fifty periods per second. In fact, these coils act, with regard to these frequencies, like electro-magnetic valves. It has long been known that when a condenser is connected in shunt with a coil and an electromotive force is used having a periodicity somewhere about that of the periodicity of the circuit composed of the condenser and coil, then considerable current will pass through the coil even if the self-induction of the coil is very large; but this relation holds true, as I have experimentally discovered, only when the iron core of the coil is exceedingly well laminated and does not form a closed magnetic circuit. But if the magnetic circuit is closed, then this relation is far from the truth. The mean value of the current that will pass then from one section of the cable to the next through any one of the auxiliary coils is equal to the mean value of the difference of potential in the conductor which is shunted by that coil divided by the impedance which the self-induction and the ohmic resistance offer to this difference of potential. Making, therefore, this impedance large, the leakage current can be reduced to any limit, especially for frequencies above fifty periods per second. In other words, the auxiliary coils act somewhat like electro-magnetic valves. The effect is that, so long as the condensers remain in order, only an inappreciable part of the main current will pass through the auxiliary coils, and hence the coils will not exercise any material influence upon the results before noted; but if a condenser should, from any cause, become inoperative, then this will be at once shown by the increase in the impedence of the line,—but as the line remains continuous, it is possible to locate the fault by determining the capacity of the cable, or by other suitable means which might not be applicable if the sections of the line had no metallic connection between them. Or, if the cable should be broken, in which case it would become inoperative, the fault may be located by ordinary methods applicable to metallic lines.

If the sections of the cable, instead of being equal and similar, as above described, were made unequal and dissimilar, then substantially the same results would be obtained. I should simply deal with the mean periodicity of the line, and establish it with reference to some previously selected periodicity, which in the case of telephonic transmission through sub-marine cables, I should make preferably higher than that of the highest strong note of the voice. For telephonic transmission over land lines we should make the previously selected periodicity considerably lower than the lowest note of the voice.

While I have described my aforesaid invention in the foregoing specification more particularly as applied to and embodied in apparatus for telegraphic or telephonic purposes it is to be distinctly understood that I do not limit it in any wise to such specific application; but on the contrary my invention includes broadly any and all applications of my method and apparatus aforesaid to the transmission of electrical currents, whether for lighting, power, heating or any other purpose wherein the same may be applied to produce beneficial results.

I claim—

1. The method of overcoming the impedence which a circuit divided into sections offers to variable currents which consists in tuning the various sections of the circuit to give a selected periodicity to the circuit by interposing a capacity or capacities large in comparison with the distributed capacity of the sections.

2. The method of overcoming the impedence which a circuit divided into sections disposed in inductive relation and in series offers to variable currents which consists in tuning the various sections of the circuit to give a selected periodicity to the circuit by interposing a capacity or capacities large in comparison with the distributed capacity of the sections.

3. The art of transmitting articulate sounds telephonically by causing undulations similar in form to the vibrations in the air accompanying said sounds to pass by electrostatic induction from one member to the rest of a series of conductors tuned to a periodicity which is considerably outside of the periodicity of said electrical undulations.

4. The art of transmitting articulate sounds telephonically by causing undulations similar in form to the vibrations in the air accompanying said sounds to pass by electrostatic induction from one member to the next of a series of conductors tuned to a periodicity considerably higher than that of the notes in the average human voice.

5. A circuit for variable currents divided into sections having the various sections tuned to a selected periodicity by the interposition of a capacity or capacities large in comparison with the distributed capacity of the sections.

6. A circuit divided into sections disposed in inductive relation and in series having the various sections tuned to a selected periodicity by the interposition of a capacity or capacities large in comparison with the distributed capacity of the sections.

7. An electric circuit for variable currents divided into sections in inductive relation and in series and tuned to give a selected periodicity by the interposition between the sections of substantially equal capacities which are large in comparison with the distributed capacity of the sections.

8. An electric circuit for variable currents divided into sections by means of condensers interposed between said sections, a coil in shunt with each condenser and a closed or substantially closed magnetic circuit surrounded by said coil, the line being tuned to a selected periodicity by having the interposed condensers of a capacity which is large in comparison with the distributed capacity of the sections.

9. The combination of electric transmitting and receiving instruments and a circuit joining them divided into sections and having the various sections tuned to a selected periodicity by the interposition of a capacity or capacities large in comparison with the distributed capacity of the sections.

10. The combination of telephonic transmitting and receiving instruments and a circuit joining them divided into sections and having the various sections tuned to a selected periodicity by the interposition of a capacity or capacities large in comparison with the distributed capacity of the sections.

11. In combination with an electrical conductor tuned to a periodicity of higher pitch than a given sound, a telephone transmitter having a diaphragm tuned to a lower pitch than said sound: whereby the tendency of the telephone diaphragm to strengthen the lower harmonics of said sound is counterbalanced or substantially counterbalanced by the tendency of the conductor to strengthen the upper harmonics so that said sound becomes transmitted substantially without distortion.

12. An electric conductor composed of sections placed in series, the said sections being tuned by the predetermined proportioning of the electro-magnetic constants so that the total periodicity of the conductor shall approximately equal a certain predetermined periodicity, substantially as described.

MICHAEL IDVORSKY PUPIN.

Witnesses:
H. R. MOLLER,
M. BOSCH.